N. C. NIELSON.
OIL SIGNAL FOR AUTOMOBILE ENGINES.
APPLICATION FILED APR. 8, 1918.
1,284,920.
Patented Nov. 12, 1918.
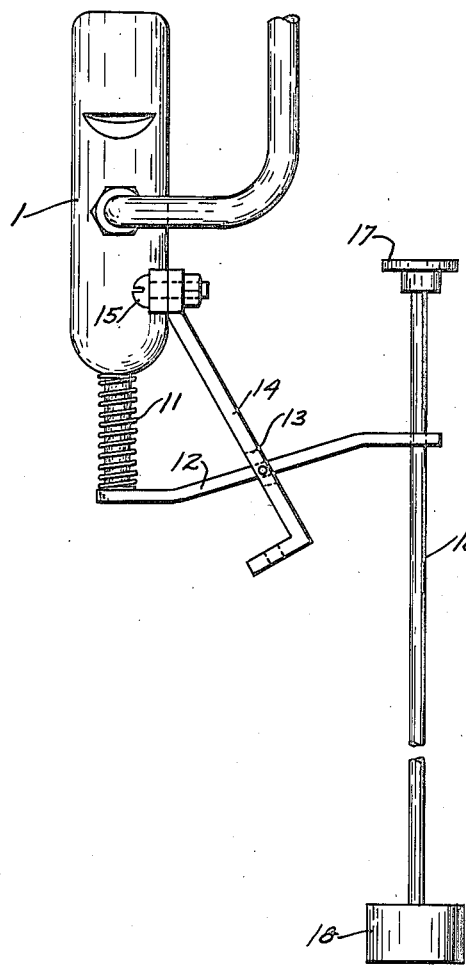
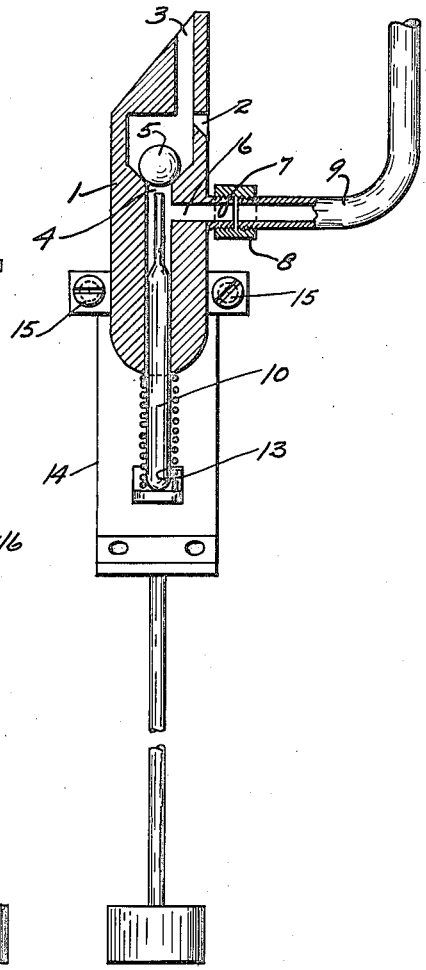

UNITED STATES PATENT OFFICE.

NIELS CHRISTIAN NIELSON, OF CLEVELAND, OHIO.

OIL-SIGNAL FOR AUTOMOBILE-ENGINES.

1,284,920.  Specification of Letters Patent.  Patented Nov. 12, 1918.

Application filed April 8, 1918. Serial No. 227,252.

*To all whom it may concern:*

Be it known that I, NIELS C. NIELSON, a citizen of Denmark, residing at Cleveland, in the county of Cuyahoga, in the State of Ohio, have invented certain new and useful Improvements in Oil-Signals for Automobile-Engines, of which the following is a specification.

This invention relates to improvements in oil signals for automobile engines. One object is to provide a device of this type that is simple in construction, positive and efficient in operation and cheap to manufacture.

With the foregoing and other objects in view the invention consists in the combination and arrangement of parts to be hereinafter fully described, pointed out in the appended claims and illustrated in the accompanying drawing which forms a part of this specification and in which—

Figure 1 is a view of my improved oil signal in elevation illustrating its application.

Fig. 2 is a side view of Fig. 1 partly in section.

Like reference characters denote corresponding parts in both views.

The reference numeral 1 denotes the signal casing which is formed with the air-intake ports 2, 3, with the valve port 4 which is normally closed by the ball valve 5 and with the port 6 which registers with the bore in the integral stem 7 which stem is connected by the nut 8 with the vacuum or suction tube 9 that communicates with the carbureter. Within the port 4 is the valve pin 10 which extends out through the lower end of the casing 1 and is encircled by the expansion spring 11 which abuts the lower end of the casing 1 and a lever 12 which lever carries the said valve pin which passes through an elongated opening 13 formed in the supporting bracket 14 and is fulcrumed upon a pin 13ª disposed in said opening; the said bracket 14 being connected by bolts or screws 15 to the said casing 1 which it supports, the lower end of said bracket being bolted to the crank case (not shown).

The end of the lever 12 remote from the valve pin is perforated to permit movement of the indicator rod 16 provided with the head 17 and with the float 18 which is disposed in the oil in the crank case. When the oil in the crank case is low the float will drop with the level of the oil and the head 17 coming in contact with one end of the lever 12 will move the same upon its fulcrum thus raising the valve pin and causing the same to displace the ball valve 5 from its normal position thus opening the upper end of port 4 when the suction from the vacuum tube 9 will draw air into the casing 1 through the ports 2, 3 causing a whistling sound and giving notice that the oil in the case is low.

What is claimed is:—

1. In an oil signal for automobile engines, a casing, said casing being formed with intake ports for the admission of air, with a valve port and with a ball valve normally closing said valve port, a suction tube operatively connected to the said casing and registering with the valve port therein, a bracket supporting said casing, a lever fulcrumed to said bracket, a valve pin carried by said lever and projected into the valve port in said casing, means connecting said lever and casing for yieldingly spacing them the maximum distance apart, an indicator rod associated with said lever and provided with a float, and a head for said indicator rod adapted for engagement with the said lever to actuate the same upon its fulcrum.

2. In an oil signal for automobile engines, a casing, said casing being formed with intake ports for the admission of air, with a valve port and with a ball valve normally closing said valve port, a suction tube operatively connected to the said casing and registering with the valve port therein, a perforated bracket supporting said casing, a lever fulcrumed in the perforated portion of said bracket, a valve pin carried by said lever and projected into the valve port in said casing capable of engagement with the said ball valve, an expansion spring encircling said valve pin and abutting said lever and casing, an indicator rod associated with said lever and provided with a float, and a head for said indicator rod adapted for engagement with the said lever to actuate the same upon its fulcrum.

In testimony that I claim the foregoing as my own I have hereto affixed by signature in the presence of two subscribing witnesses.

NIELS CHRISTIAN NIELSON.

Witnesses:
E. H. CHACE,
WM. THOMAS.